US010613770B2

(12) United States Patent
Gao et al.

(10) Patent No.: US 10,613,770 B2
(45) Date of Patent: Apr. 7, 2020

(54) METHOD AND APPARATUS FOR CONTROLLING ACCESS TO A DISK ARRAY

(71) Applicant: EMC IP HOLDING COMPANY LLC, Hopkinton, MA (US)

(72) Inventors: Jian Gao, Beijing (CN); Jibing Dong, Beijing (CN); Xinlei Xu, Beijing (CN); Lifeng Yang, Beijing (CN); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 324 days.

(21) Appl. No.: 15/384,769

(22) Filed: Dec. 20, 2016

(65) Prior Publication Data
US 2017/0185331 A1 Jun. 29, 2017

(30) Foreign Application Priority Data
Dec. 29, 2015 (CN) .......................... 2015 1 1019083

(51) Int. Cl.
*G06F 3/00* (2006.01)
*G06F 3/06* (2006.01)
(52) U.S. Cl.
CPC .......... *G06F 3/0619* (2013.01); *G06F 3/0665* (2013.01); *G06F 3/0689* (2013.01)
(58) Field of Classification Search
None
See application file for complete search history.

(56) References Cited

U.S. PATENT DOCUMENTS

| 8,010,738 B1 | 8/2011 | Chilton et al. |
| 8,046,551 B1 | 10/2011 | Sahin |
| 8,130,554 B1 | 3/2012 | Linnell |

(Continued)

FOREIGN PATENT DOCUMENTS

| CN | 102508620 | 6/2012 |
| CN | 103314361 | 9/2013 |

(Continued)

OTHER PUBLICATIONS

Du Yimo, et al.; "Mule-RAID: Constructing Large Scale and High-Performance SSD with Multiple Level RAID Architecture", Journal of Computer Research and Development; vol. 49; Issue Z1; Dec. 31, 2012, pp. 111-117.

*Primary Examiner* — Midys Rojas
(74) *Attorney, Agent, or Firm* — BainwoodHuang

(57) ABSTRACT

A method and an apparatus for controlling an access to a disk array. The method comprises: receiving a command for writing to a first stripe of the plurality of stripes; and determining a first parity position for the first stripe by searching a mapping table, the mapping table recording a first mapping between the first stripe and the first parity position allocated in the first stripe, the first parity position being arranged in a first disk of the plurality of disks having a minimum wearing level. The embodiments of the present disclosure further disclose a corresponding apparatus. The embodiments of the present disclosure provides a solution for controlling an access to a disk array, which can achieve a dynamic balance of wearing levels among all of the disks in a RAID, thereby making it possible to control or manage a failure order of the disks.

23 Claims, 9 Drawing Sheets

(56) References Cited

U.S. PATENT DOCUMENTS

| | | |
|---|---|---|
| 8,880,801 B1 | 11/2014 | Robins et al. |
| 9,104,326 B2 | 8/2015 | Frank et al. |
| 9,208,162 B1 | 12/2015 | Hallak et al. |
| 9,286,003 B1 | 3/2016 | Hallak et al. |
| 9,304,889 B1 | 4/2016 | Chen et al. |
| 9,342,465 B1 | 5/2016 | Meiri |
| 9,367,398 B1 | 6/2016 | Ben-Moshe et al. |
| 9,378,106 B1 | 6/2016 | Ben-Moshe et al. |
| 9,396,243 B1 | 7/2016 | Halevi et al. |
| 9,418,131 B1 | 8/2016 | Halevi et al. |
| 9,442,941 B1 | 9/2016 | Luz et al. |
| 9,606,870 B1 | 3/2017 | Meiri et al. |
| 9,652,352 B1 | 5/2017 | Chilton et al. |
| 9,665,305 B1 | 5/2017 | Natanzon et al. |
| 9,811,288 B1 | 11/2017 | Chen et al. |
| 9,910,791 B1 | 3/2018 | Dibb et al. |
| 9,946,471 B1 | 4/2018 | More et al. |
| 9,996,539 B1 | 6/2018 | Natanzon |
| 10,025,843 B1 | 7/2018 | Meiri et al. |
| 10,042,751 B1 | 8/2018 | Veprinsky et al. |
| 10,055,161 B1 | 8/2018 | Meiri et al. |
| 10,082,965 B1 | 9/2018 | Tamilarasan et al. |
| 2015/0199152 A1 | 7/2015 | Asnaashari |
| 2017/0337107 A1* | 11/2017 | Zhang .................. G06F 3/0619 |

FOREIGN PATENT DOCUMENTS

| | | |
|---|---|---|
| CN | 103339609 | 10/2013 |
| CN | 104407815 | 3/2015 |

\* cited by examiner

METHOD AND APPARATUS FOR CONTROLLING ACCESS TO A DISK ARRAY

RELATED APPLICATIONS

This application claim priority from Chinese Patent Application Number CN201511019083.X, filed on Dec. 29, 2015 at the State Intellectual Property Office, China, titled "METHOD AND APPARATUS FOR CONTROLLING READING AND WRITING DISK ARRAYS," the contents of which is herein incorporated by reference in its entirety

FIELD

Embodiments of the present disclosure generally relate to the technical field of storage, and more specifically, relates to a method and apparatus for controlling an access to a disk array.

BACKGROUND

A disk array, such as redundant array of independent disks (RAID), has wide application in the data storage field, which may prevent data lost caused by failure of a disk or a storage apparatus by utilizing redundancy of data and disks. According to different demands of protection, different RAID structures are defined, like common RAID 0, RAID 1, RAID 3, RAID 5, RAID 6, RAID 10 and etc. Conventionally, each disk in a RAID may be logically divided into stripes each with fixed storage capacity. In order to improve reliability of the disk array, redundant data can be used to perform error detection and data repair. For example, RAID 3, RAID 5 and RAID 6 typically use XOR parity to ensure data redundancy for the stripes.

Generally speaking, for a disk being more often as a parity position, read and write operations may result in a higher disk wearing level. However, all of the existing traditional striped parity RAID algorithms may have a fixed sub-algorithm to select a disk position to store stripe parity, instead of dynamically balancing wearing among the disks based on the wearing levels of all of the disks in the RAID. In the meantime, the traditional RAID algorithms that selecting a fixed parity position cannot control or affect the wearing levels of the disks in the same stripe. As a result, the wearing level of the RAID cannot be anticipated, and it is unable to control the growth of the wearing level.

SUMMARY

In order to solve the above problems, embodiments of the present disclosure provides a solution for controlling an access to a disk array, which can achieve a dynamic balance of wearing levels among all of the disks in a RAID, thereby making it possible to control or manage a failure order of the disks. In addition, the embodiments of the present disclosure can realize disk wearing control based on a strategy.

According to a first aspect of the present disclosure, there is provided a method of controlling an access to a disk array, the disk array including a plurality of disks that are divided into a plurality of stripes with same fixed storage capability, the method comprising: receiving a command for writing to a first stripe of the plurality of stripes; and determining a first parity position for the first stripe by searching a mapping table, the mapping table recording a first mapping between the first stripe and the first parity position allocated in the first stripe, the first parity position being arranged in a first disk of the plurality of disks having a minimum wearing level.

In some embodiments, the method further comprises: in response to determining that a second stripe of the plurality of stripes is unable to be retrieved in the mapping table, selecting from the plurality of disks a second disk with a minimum wearing level among the plurality of disks to arrange a second parity position for the second stripe; and recording a second mapping between the second stripe and the second parity position in the mapping table.

In some embodiments, the method further comprises: determining an actual wearing level of a third disk of the plurality of disks based on a ratio of an average erase count to a maximum erase count of the third disk; and determining a wearing level of the third disk based on the actual wearing level of the third disk.

In some embodiments, the method further comprises: in response to a trigger condition being satisfied, updating the mapping table.

In some embodiments, the trigger condition comprises at least one of: a time interval exceeds a first threshold since the mapping table is detected to record mappings associated with all of the plurality stripes, a count for input and output requests exceeds a second threshold since the mapping table is detected to record mappings associated with all of the plurality stripes, and traffic of the input and output requests exceeds a third threshold since the mapping table is detected to record mappings associated with all of the plurality stripes.

In some embodiments, the updating the mapping table comprises: determining a respective wearing level for each of the plurality of disks; updating a third parity position for a third stripe of the plurality of stripes periodically by selecting from the plurality of disks a fourth disk with a minimum wearing level among the plurality of disks to arrange the third parity position; and recording a third mapping between the third stripe and the updated third parity position in the mapping table.

In some embodiments, the updating the mapping table comprises: updating a fourth parity position for a fourth stripe of the plurality of stripes periodically by exchanging the fourth parity position with a data position; and recording a fourth mapping between the fourth stripe and the updated fourth parity position in the mapping table.

In some embodiments, the determining a wearing level of the third disk comprises: setting a reference wearing level for the third disk; and determining the wearing level of the third disk by adding the reference wearing level and the actual wearing level of the third disk.

In some embodiments, the method further comprises: adjusting the reference wearing level of the third disk dynamically.

In some embodiments, the method further comprises: adjusting the reference wearing level of the third disk in response to a user request.

According to a second aspect of the present disclosure, there is provided an apparatus for controlling an access to a disk array, the disk array including a plurality of disks that are divided into a plurality of stripes with same fixed storage capability, the apparatus comprising: a receiving unit configured to receive a command for writing to a first stripe of the plurality of stripes; and a mapping management unit configured to determine a first parity position for the first stripe by searching a mapping table, the mapping table recording a first mapping between the first stripe and the first parity position allocated in the first stripe, the first parity position being arranged in a first disk of the plurality of disks having a minimum wearing level.

In some embodiments, the mapping management unit is further configured to: in response to determining that a second stripe of the plurality of stripes is unable to be retrieved in the mapping table, select from the plurality of disks a second disk with a minimum wearing level among the plurality of disks to arrange a second parity position for the second stripe; and record a second mapping between the second stripe and the second parity position in the mapping table.

In some embodiments, the mapping management unit is further configured to: determine an actual wearing level of a third disk of the plurality of disks based on a ratio of an average erase count to a maximum erase count of the third disk; and determine a wearing level of the third disk based on the actual wearing level of the third disk.

In some embodiments, the mapping management unit is further configured to: in response to a trigger condition being satisfied, updating the mapping table.

In some embodiments, the trigger condition comprises at least one of: a time interval exceeds a first threshold since the mapping table is detected to record mappings associated with all of the plurality stripes, a count for input and output requests exceeds a second threshold since the mapping table is detected to record mappings associated with all of the plurality stripes, and traffic of the input and output requests exceeds a third threshold since the mapping table is detected to record mappings associated with all of the plurality stripes.

In some embodiments, the mapping management unit is further configured to update the mapping table by: determining a respective wearing level for each of the plurality of disks; updating a third parity position for a third stripe of the plurality of stripes periodically by selecting from the plurality of disks a fourth disk with a minimum wearing level among the plurality of disks to arrange the third parity position; and recording a third mapping between the third stripe and the updated third parity position in the mapping table.

In some embodiments, the mapping management unit is further configured to update the mapping table by: updating a fourth parity position for a fourth stripe of the plurality of stripes periodically by exchanging the fourth parity position with a data position; and recording a fourth mapping between the fourth stripe and the updated fourth parity position in the mapping table.

In some embodiments, the mapping management unit is further configured to determine a wearing level of the third disk by: setting a reference wearing level for the third disk; and determining the wearing level of the third disk by adding the reference wearing level and the actual wearing level of the third disk.

In some embodiments, the mapping management unit is further configured to: adjust the reference wearing level of the third disk dynamically.

In some embodiments, the mapping management unit is further configured to: adjust the reference wearing level of the third disk in response to a request from a user.

According to a third aspect of the present disclosure, there is provided a computer readable storage media comprising computer readable program instructions stored thereon, the computer readable program instructions being used to perform the method of controlling an access to a disk array according to the embodiments of the disclosure.

According to a fourth aspect of the present disclosure, there is provided a storage system, comprising an apparatus for controlling an access to a disk array according to the embodiments of the disclosure.

BRIEF DESCRIPTION OF THE DRAWINGS

With reference to the accompanying drawings, the non-restrictive embodiments are detailed to facilitate better understanding of the embodiments of the present disclosure, and other objectives, details, features and advantages of the embodiments of the present disclosure will become more apparent. In the drawings.

DETAILED DESCRIPTION OF THE EMBODIMENTS

Figure 1:
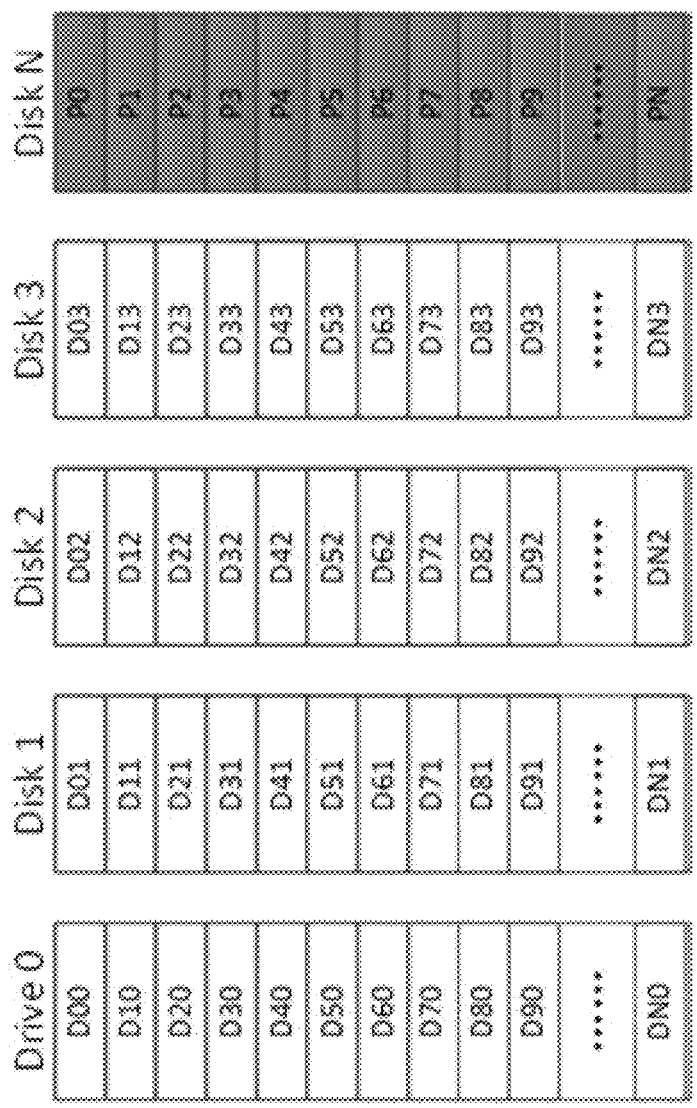
FIG. 1 illustrates a schematic diagram of stripe layouts of RAID 3.

Hereinafter, embodiments of the present disclosure will be described in detail with reference to the drawings. It should be noted that similar components or functional members in the drawings may be represented by identical numerical numbers. The appended drawings only intend to illustrate embodiments of the present disclosure. Those skilled in the art may obtain alternative embodiments from the following descriptions without departing from the spirits and scope of the present disclosure.

Figure 2:
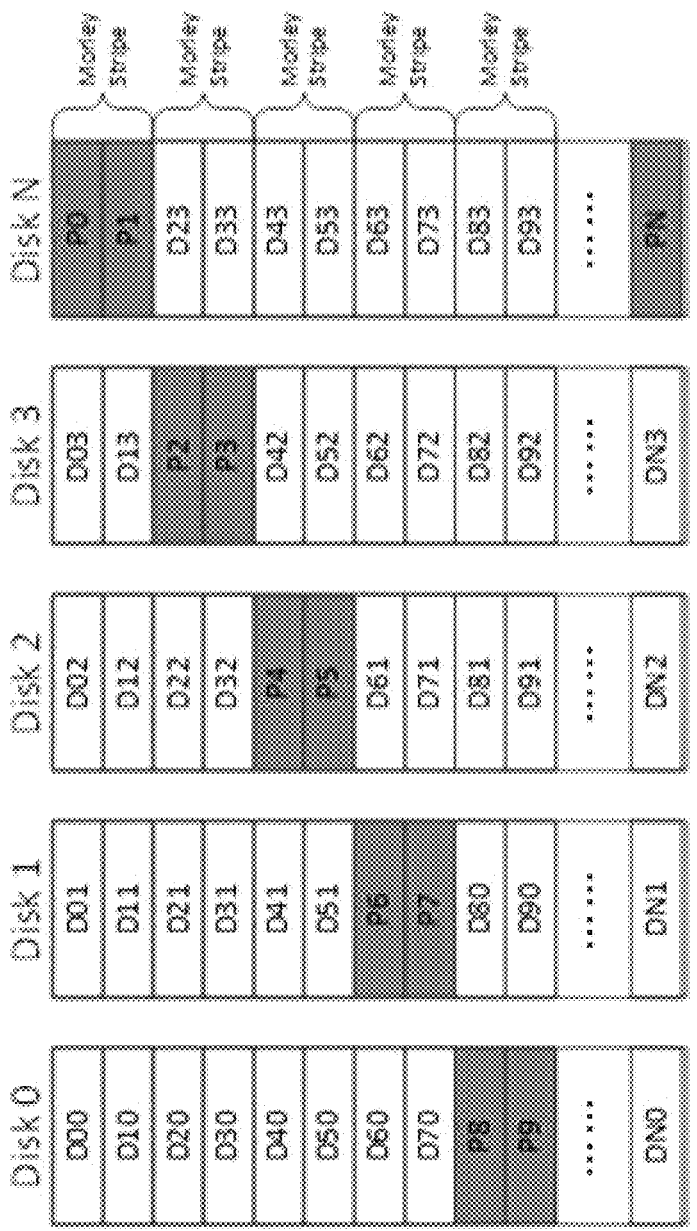
FIG. 2 illustrates a schematic diagram of stripe layouts of RAID 5.
Figure 3:
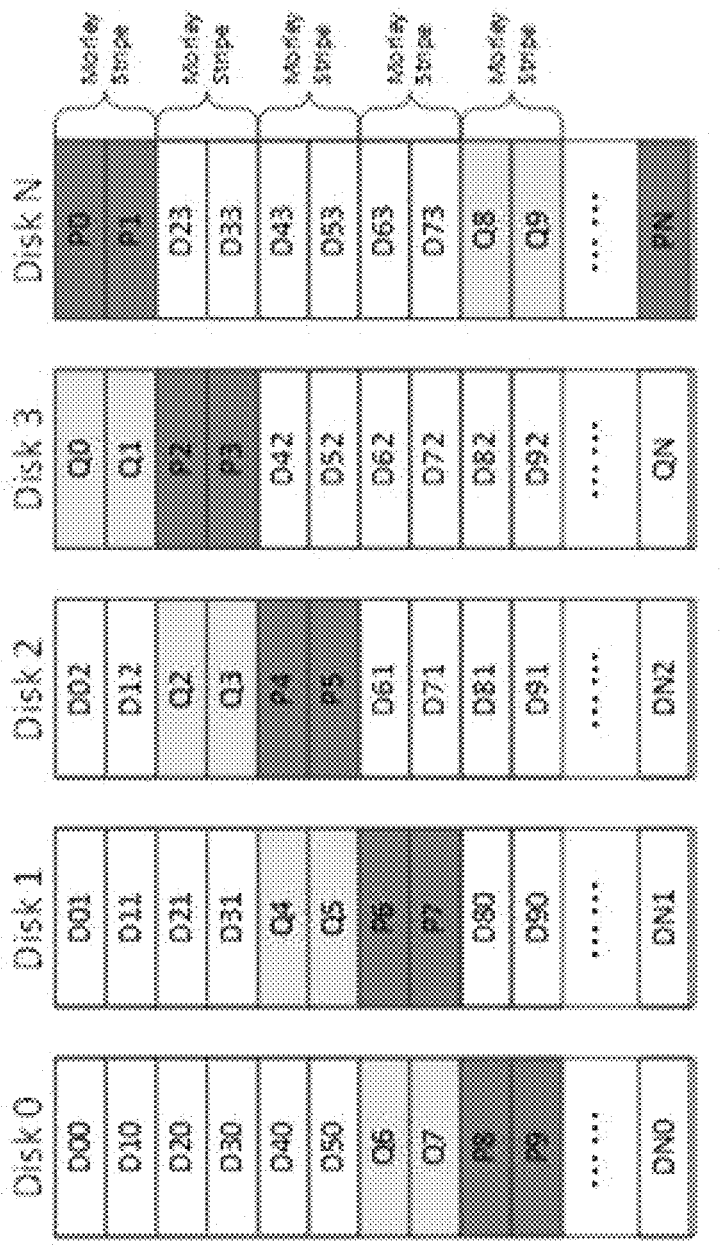
FIG. 3 illustrates a schematic diagram of stripe layouts of RAID 6.

FIGS. 1-3 respectively illustrate schematic diagrams of stripe layouts of RAID 3, RAID 5 and RAID 6. All of the existing traditional striped parity RAID algorithms may have a fixed sub-algorithm to select a disk position to store stripe parity.

FIG. 1 illustrates a schematic diagram of stripe layouts of RAID 3. RAID 3 employs a dedicated disk (e.g., disk N) as a parity disk, and other disks (e.g., disks 0-3) act as data disks. Data is stored across the data disks in bytes. The data of the same stripe on different disks is be subjected to XOR parity, and the result is written into the parity disk.

FIG. 2 illustrates a schematic diagram of stripe layouts of RAID 5. RAID 5 stores data in blocks. The parity data are distributed over all of the disks (e.g., disks 0-N) in the array instead of a dedicated parity disk. However, the distribution of the parity data can be fixed. For example, the parity position is rotated to the next disk after a fixed logical block address (LBA) interval. In some embodiments of the present disclosure, for example, the interval may be referred to as a Morley stripe.

FIG. 3 shows a schematic diagram of stripe layouts of RAID 6. RAID 6 employs dual parity to enhance data redundancy. Similar to the case of RAID 5, the rotating method of the dual parity data distribution is also fixed. In one embodiment, for example, as shown in FIG. 3, the dedicated parity disk is not applied in the array either, the odd parity position on a disk is rotated to a next disk every other Morley stripe, and so does the even parity position. That is, an interval (e.g., a Morley stripe in FIG. 3) between the parity positions of two logically adjacent disks is fixed, and the rotation method of the dual parity data distribution is fixed.

With IO performance of the disk array being improved, a wearing level of the disk may be increased. In IO operations, the write operation may greatly affect the wearing level of the disk. There are mainly two write algorithms for a RAID:

The first one is to do a full stripe write to all of the disks, where all of the disks in a stripe would be written equally in any write. In the case, the full stripe write may introduce a same wearing impact to each of the disks.

Figure 4:
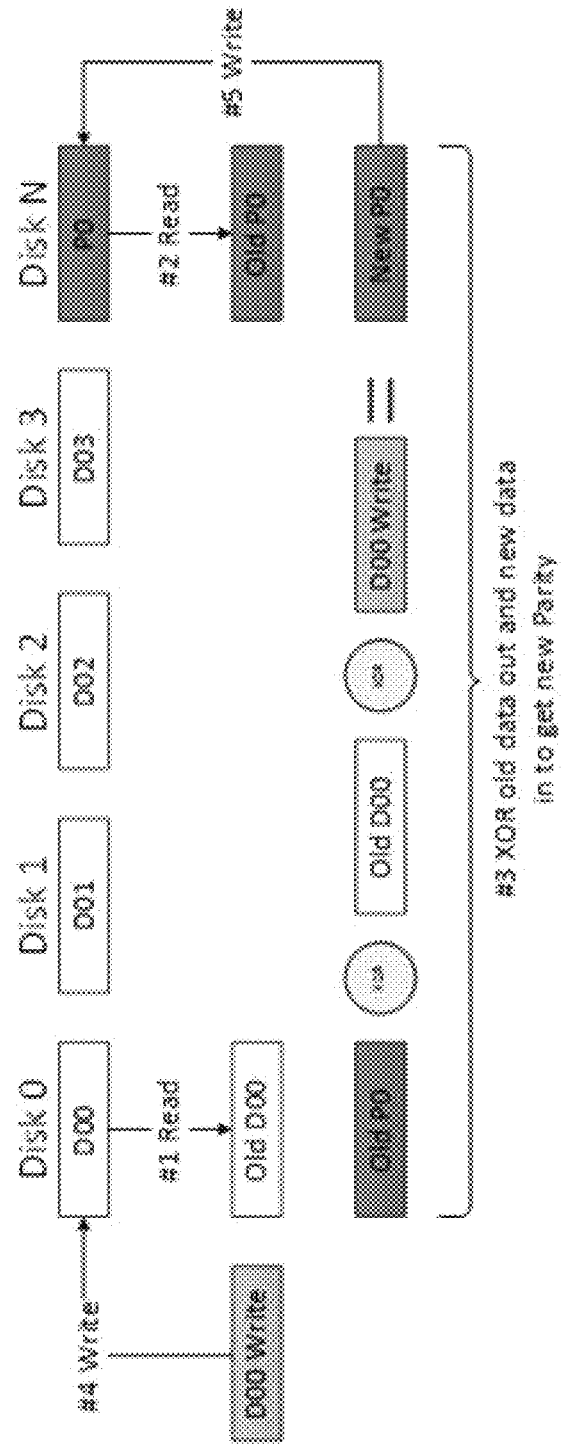
FIG. 4 illustrates a schematic diagram of an example of a random data write.

The second one is to do on-demand partial stripe write to a necessary disk. For the sake of discussion, RAID 5 may be described as an example. FIG. 4 illustrates an example of a random data write. In this case, it is only required to write data into stripe 0 of disk 0, i.e., position D00. The write may be divided into five steps:
1. reading old data from a data position (e.g., D00);
2. reading old parity from a parity position (e.g., P0);
3. getting new parity by doing an XOR operation to the old parity, the old data and new data to be written;
4. writing the new data into D00;
5. writing the new parity into P0.

It is seen from the above that, in the second write algorithm, when writing data into a data disk, four IO operations are required in total, specifically two reads and two writes. It should be noted that, the #1, #2 . . . #5 in FIG. 4 only show an example of a logical order of operations. However, the real IO operations can be initiated to different disks at the same time and in parallel. According to this write algorithm, two data disk writes may need six IO operations, three data disk writes may need eight IO operations, and so forth.

Figure 5:
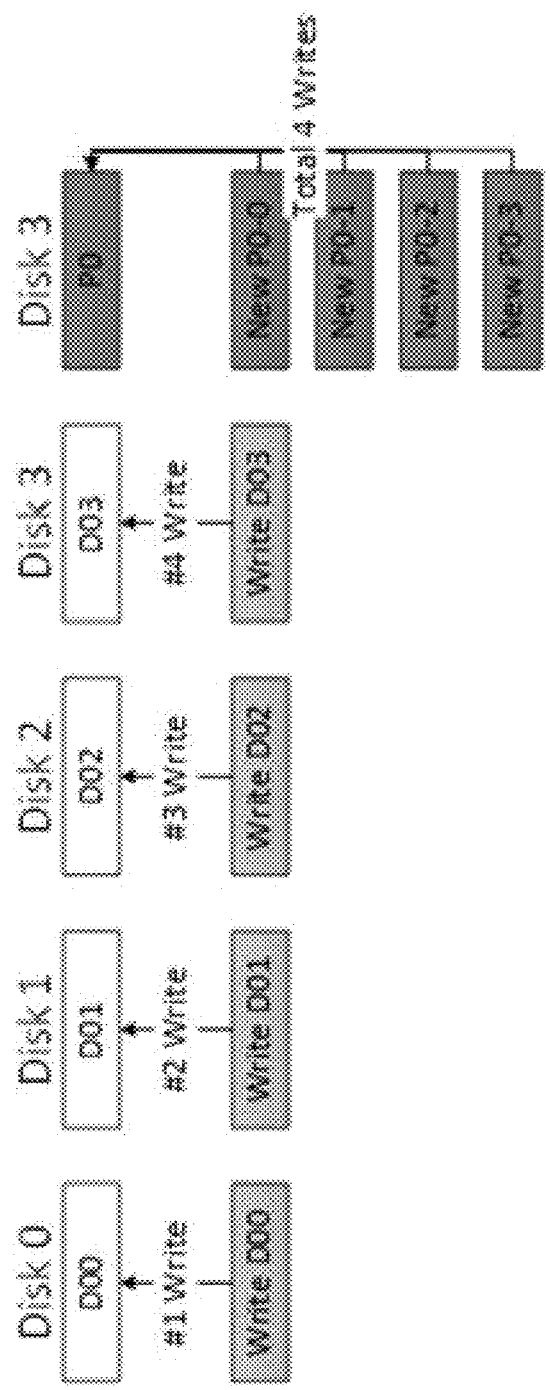
FIG. 5 illustrates a schematic diagram of another example of a random data write.

In the second write algorithm, namely the on-demand partial stripe write, the parity disk must be written no matter how many or which of data disks would be written. If it is required to writing data randomly four times and it is required to writing to one of the four data disks each time, each of the data disks will be written into once but the parity disk will be written into four times, as shown in FIG. 5. So in this case, the parity disk would get 4 times wearing impact of that for each of the data disks. Hence, the disk used as the parity position usually has a higher wearing level. However, as stated above, all of the existing traditional striped parity RAID algorithms may have a fixed sub-algorithm to select a disk position to store stripe parity, and therefore fail to dynamically balance wearing among the disks based on wearing statuses of all of the disks in a RAID.

It should be appreciated that, in the first write algorithm, namely the full stripe write, all of the disks in a stripe would be written equally in any write. Therefore, the full stripe write may introduce a same wearing impact to each of the disks, and there is no wearing difference among the disks in the disk array. Accordingly, embodiments of the present disclosure are not directed to improving the full stripe write algorithm directly.

Further, it should be appreciated that embodiments of the present disclosure take a following technical fact into consideration: the read operation may not introduce a remarkable impact on the disk wearing. Therefore, in the embodiments of the present disclosure, the impact of the read on the disk wearing may be reasonably neglected, but the impact of the write on the disk wearing should be fully considered. However, those skilled in the art readily obtain, based on the prior art and the common knowledge in the art, how the read should be performed in the embodiments of the present disclosure.

For the sake of description, RAID 5 is taken as an example to illustrate the embodiments of the present disclosure. However, it should be understood that the embodiments of the present disclosure can also be easily applied to RAID 3 and RAID 6 without departing from the spirits of the present disclosure.

According to the embodiments of the present disclosure, the parity position is dynamically selected in a stripe of the RAID, and the disk with a minimum wearing level may be selected as the parity disk for the stripe. Hereinafter, the descriptions are detailed with reference to FIGS. 6-9.

Figure 6:
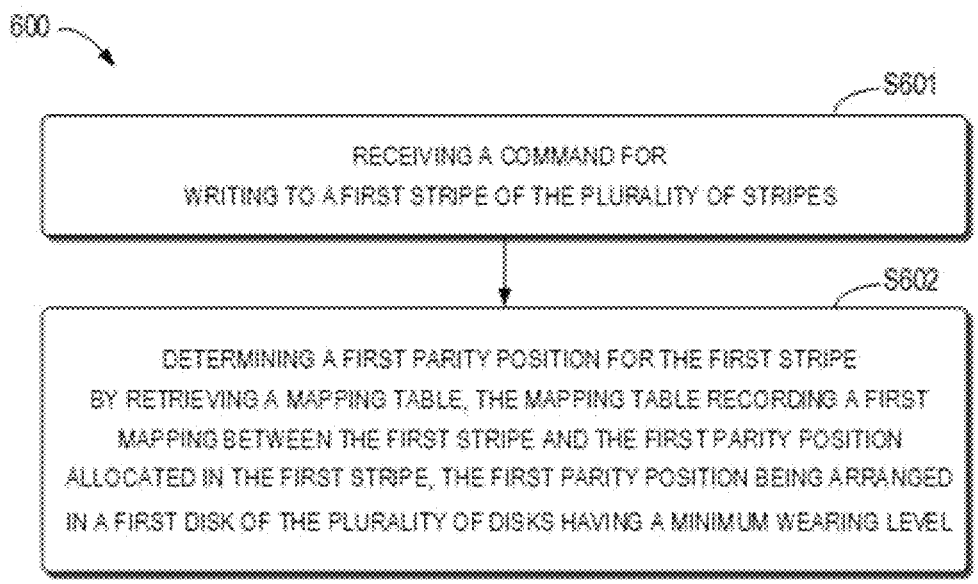
FIG. 6 illustrates a flow chart of a method for controlling an access to a disk array according to one embodiment of the present disclosure.

FIG. 6 illustrates a flow chart of a method for controlling an access to a disk array according to one embodiment of the present disclosure.

As shown in FIG. 6, upon receiving a command for wiring to a stripe, a parity position for the stripe can be determined by searching a mapping table. Specifically, in S601, a command for writing to the stripe is received; and in S602, a parity position for the stripe is determined by searching a mapping table. The mapping table records a mapping between the stripe and the parity position allocated in the stripe, and the parity position is arranged in a disk with a minimum wearing level.

Figure 7:
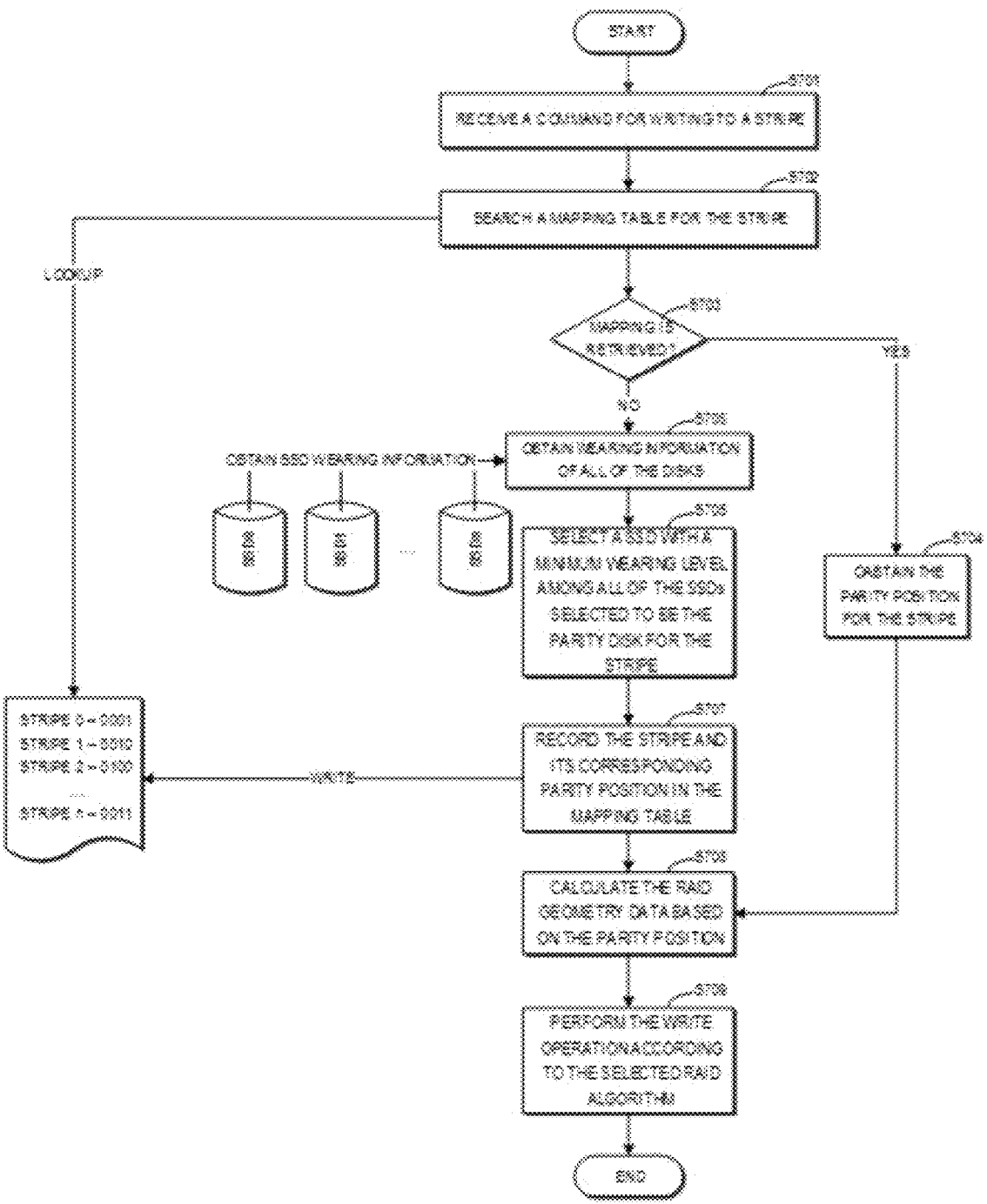
FIG. 7 illustrates a flow chart of a method for controlling an access to a disk array according to one embodiment of the present disclosure.

FIG. 7 illustrates a detailed flow chart of a method for controlling an access to a disk array according to one embodiment of the present disclosure. It should be understood that the flow chart described in FIG. 7 is only an example for implementing the idea of the present disclosure, and the steps included therein may be omitted, modified or substituted without departing from the scope of the present disclosure.

In S701, a command for writing to a stripe is received.

In S702, a mapping table is searched for the stripe. The mapping table records a mapping between the stripe and a parity position allocated in the stripe, and the parity position is arranged in a disk with a minimum wearing level.

For example, the disk to arrange the parity position may be represented as follows.

In one embodiment, for example, in a real RAID application, one RAID 5 may support 16 disks at most, and thus 4 bits can be used to represent 16 possible disks for arranging the parity position. For example, 0b0001 may represent that disk 0 serves as the disk for arranging the parity position, 0b0010 may represent that disk 1 serves as the disk for arranging the parity position, and 0b1111 may represent that disk 15 serves as the disk for arranging the parity position.

For implementations in other RAID 5/3 which may have a different drive number limit in one RAID, this can be easily scaled by adding more bits to represent more possibilities for the parity position. A dual bit series may be used to represent the parity position for RAID 6, e.g. for a RAID 6 with 16 disks. For example, P=0b0001 and Q=0b0100 may show that disk 0 is the disk for the position of parity P and disk 4 is the disk for the position of parity Q.

In the preceding striped RAID, a fixed rotation method is used to select the parity position or it may be considered that the parity position is predefined. Therefore, for the preceding RAID, there is no need to record which disk is the parity disk in a specified stripe, because it can be determined by the RAID.

In S703, it is determined whether the mapping is retrieved. In the step, it is firstly determined if the stripe can be retrieved in the mapping table. If no, the mapping cannot be retrieved; and if yes, then it is determined whether a corresponding parity position in the mapping table is valid to this write operation. If yes, the mapping is retrieved, and otherwise, the mapping is not retrieved.

In S704, obtain the parity position for the stripe if the mapping is retrieved in S703. Then the process proceeds to S708.

In S705, obtain wearing information of all of the disks if the mapping is not retrieved in S703.

Hereinafter, one implementation is taken as an example to describe how to obtain a wearing level of a disk. Because a solid state disk (SSD) is a storage medium having a faster reading and writing speed than a traditional hard disk, which may have greatly improved performance with a low cost, it has wide application in storage products. In some cases, SSDs may be directly arranged in the traditional RAID. A SSD is taken as an example of a disk in a RAID to illustrate one embodiment of the present disclosure.

Conventionally, the information for measuring the wearing level of the SSD may include a max erase count, an average erase count, and an end of life (EOL) per cycle, power on hours and even temperature obtained from the SSD via some SCSI extension OpCode. The max erase count is the max erasures on any channel in the SSD while EOL per cycle is the most erasures that any cell can endure. The average erase count shows a wearing status of a specific SSD channel and a cell.

The average erase count can be compared to the max erase count, because the statistic from channel perspective means more than from cell perspective due to SSD manufacturing and design. Meanwhile, it also shows the overall wearing level of the SSD.

In one embodiment, based on the wearing information obtained from the SSD, a wearing level of a SSD is calculated as follows:

$$\text{SSD Wearing Level} = \text{Average Erase Count} + \text{Max Erase Count} \quad (1)$$

where a greater value indicates a higher wearing level of the disk, which is more close to its end of life. According to the equation (1), the wearing level of each of the SSD disks can be calculated.

In S706, a SSD with a minimum wearing level among all of the SSDs is selected to be the parity disk for the stripe.

In S707, The Stripe And Its Corresponding Parity Position Is Recorded In The Mapping Table. The parity disk selected in S06 serves as the disk for arranging the parity position of the stripe and the mapping associated with the parity disk is recorded in the mapping table.

In S708, the RAID geometry data is calculated based on the parity position. In the step, according to information such as the parity position, the data disk distribution in the RAID and so on, a write algorithm is selected for the received write request, and information required to perform the IO operation is calculated, such as the SSD to be operated, the actual LBA address and etc.

In S709, the write operation is performed according to the selected RAID algorithm based on the RAID geometry data. In the step, the write operation is performed on the stripe based on the selected RAID algorithm and the RAID geometry data calculated in S708.

Through the method, the wearing level of each of SSDs in a same RAID can be continuously adjusted. Each time a new parity position for a new stripe can be obtained. For example, in VNX2, for a new stripe Morley Stripe, the RAID would get wearing levels of all of the SSDs firstly and then choose a SSD with a minimum wearing level as the parity disk. Therefore, the method can work well.

Theoretically, the wearing levels of the SSDs in the RAID are dynamically adjusted according to the foregoing method, and the wearing level of each of the SSDs will ultimately approach to a balance or become very close. However, with regard to RAID 5, failures of two SSDs may cause the RAID damaged, and therefore data lost would happen. With regard to RAID 6, failures of three SSDs may cause the RAID damaged, and therefore data lost would happen. Hence, there will be a potential risk if all of the SSDs have a same wearing level. Preferably, the foregoing solution can be slightly modified to control the wearing progress of the SSDs.

In one embodiment of the present disclosure, a reference wearing level can be set for a SSD to effectively control a failure order of the SSDs in the same RAID. During the initialization of the RAID, a reference wearing level may be selected for a SSD. For example, 0.05 can be set for the SSD0 and 0 can be set for other SSDs. Then, wearing information can be obtained from all of the SSDs and a respective actual wearing level of each of the SSDs can are calculated, e.g., the respective actual wearing level for the SSD can be calculated according to the equation (1), the respective reference wearing level associated with the SSD can be added to the respective actual wearing level to obtain the wearing level for the SSD. Then, a SSD with a minimum wearing level among all of the SSDs can be selected as the parity disk. Base on the above description, the SSD0 may have a longer service life than other SSDs without considering other factors in this example.

In one embodiment, the reference wearing level may be dynamically adjusted to implement the wearing control of SSDs in the traditional RAID.

In one embodiment, a strategy-based SSD wearing control in the traditional RAID can be performed in response to a request from a user. According to different scenarios of the storage system, a user may have different requirements for the storage system being used. In one embodiment, the user is allowed to choose a different SSD to use based on a wearing status of a SSD. That is, the strategy-based SSD wearing control can be realized.

The user may send a request to the system, and the system is driven by the request to control the service life of the SSDs. A strategy may comprise, for example, the user may desire that all of the SSDs are completely uniformly worn. A further strategy may comprise, for example, with regard to different SSD types, e.g. the SSDs with high-endurance, moderate-endurance and low-endurance, the user may select a certain type of SSDs for preferential use, and the system may control the wearing of the SSDs in the RAID based on the user's strategy. For instance, the user may select a low-endurance SSD for preferential use; and the system may assign a weight to the reference wearing level of the low-endurance disk so as to enable the low-endurance SSD to be more likely selected as the parity disk, and replaces it when it is close to its end of life. Alternatively, the user may select one or more blocks of a SSD disk for preferential use according to the user's needs; and the system assign a weight to the corresponding reference wearing level to enable the one or more blocks of the SSD disk to be more likely selected as the parity disk, and replaces them when they are close to their end of life.

Figure 8:
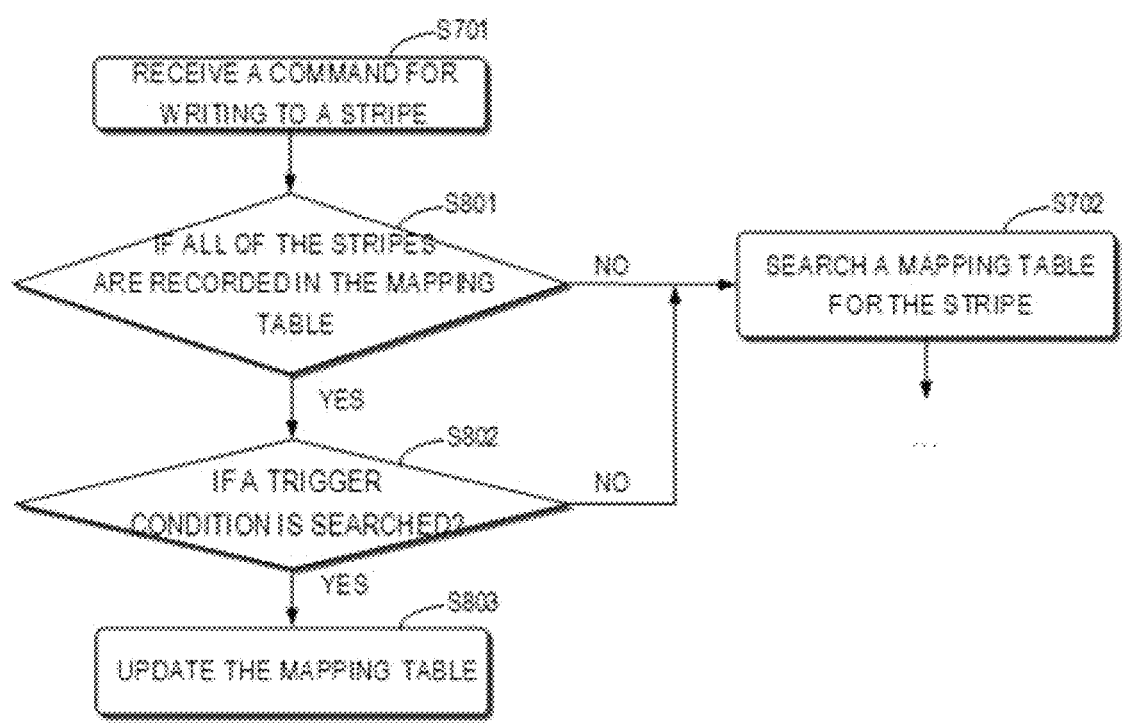
FIG. 8 illustrates a flow chart for updating a mapping table according to one embodiment of the present disclosure.

FIG. 8 illustrates a flow chart for updating a mapping table according to one embodiment of the present disclosure. When each of the stripes in the RAID is assigned with a parity position, that is, the mapping table has included all of the stripes of the RAID, the mapping table may be updated based on different strategies.

Hereinafter, FIG. 8 is described with reference to the specific flow chart of FIG. 7. After receiving the command for writing to the stripe in S701 in FIG. 7, in S801, it is firstly determined whether all of the stripes are recorded in the mapping table. If some stripes are not recorded, the process proceeds to S702 in FIG. 7 and perform the following steps as described with reference to FIG. 7. If the mapping table has recorded all of the stripes, the process proceeds to S802 to determine whether an trigger condition is satisfied. If the trigger condition is satisfied, the process proceeds to the S803 to update the mapping table. If the trigger condition is not satisfied, the process proceeds to S702 in FIG. 7 and perform the following steps as described with reference to FIG. 7.

In one embodiment, if all of the stripes of the RAID have been recorded in the mapping table, the mapping table can be updated according to different scenarios of the data operation in an actual application. For example, wearing statuses of all of the SSDs may be monitored and the mapping table may be updated every a certain interval. Alternatively, the wearing statuses of all of the SSDs may be monitored and the mapping table may be updated if a count for IO requests or traffic of the IO requests exceeds a predetermined threshold. That is, in response to determining that the mapping table has recorded mappings associated with all of the stripes, the trigger condition may comprise at least one of: a time interval exceeds a first threshold since the mapping table is detected to record mappings associated with all of the plurality stripes, a count for input and output requests exceeds a second threshold since the mapping table is detected to record mappings associated with all of the plurality stripes, and traffic of the input and output requests exceeds a third threshold since the mapping table is detected to record mappings associated with all of the plurality stripes.

According to one embodiment of the present disclosure, the updating the mapping table may be performed as follows. For example, firstly determining a respective wearing level for each of the disks, periodically updating corresponding parity positions for some stripes based on a minimum wearing level principle, and then recording mappings between the stripes and their updated parity positions. Alternatively or in addition, firstly determining a respective wearing level for each of the disks, periodically updating corresponding parity positions for some stripes by exchanging the data positions of the stripes with their parity positions, and then recording mappings between the stripes and their updated parity positions.

It should be noted that, in the embodiments of the present disclosure, because the parity positions are dynamically selected, the mappings need to be reloaded from the disk to the memory during rebooting the system; otherwise the RAID cannot perform IO operations. As a result, the parity positions should be recorded in the memory at the RAID level. In the meantime, when the RAID itself is degraded or even damaged due to some other factors, the mappings need to be accessed. Therefore, the mapping table should be also stored on the disk space outside of the RAID so as to decouple the mappings with the RAID address space.

Figure 9:
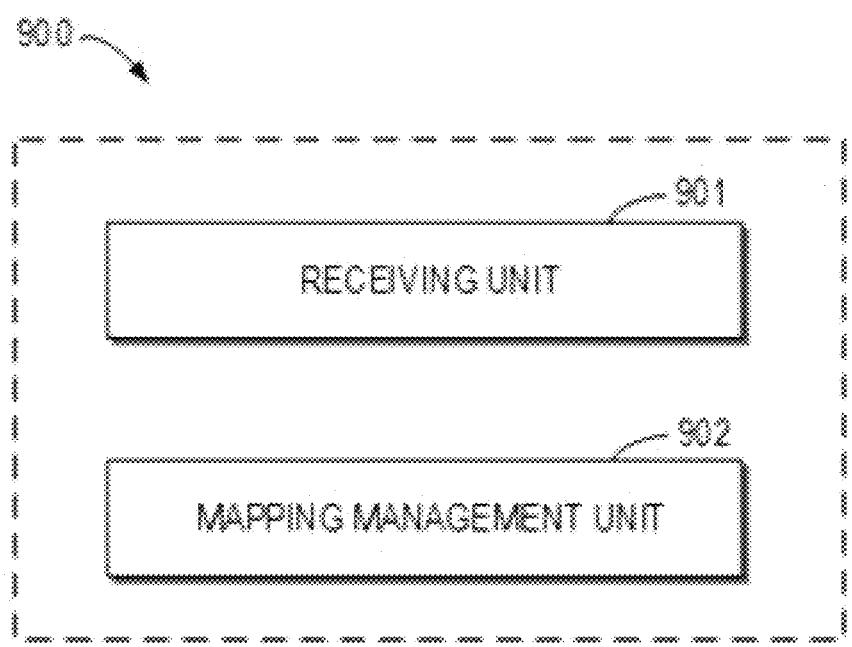
FIG. 9 illustrates a schematic diagram of an apparatus for controlling an access to a disk array according to one embodiment of the present disclosure.

FIG. 9 illustrates an apparatus for controlling an access to a disk array according to one embodiment of the present disclosure, comprising: a receiving unit 901 configured to receive a command for writing to a first stripe of the plurality of stripes; and a mapping management unit 902 configured to determine a first parity position for the first stripe by searching a mapping table, the mapping table recording a first mapping between the first stripe and the first parity position allocated in the first stripe, the first parity position being arranged in a first disk of the plurality of disks having a minimum wearing level.

The mapping management unit 902 is further configured: in response to determining that a second stripe of the plurality of stripes is unable to be retrieved in the mapping table, select from the plurality of disks a second disk with a minimum wearing level among the plurality of disks to arrange a second parity position for the second stripe; and record a second mapping between the second stripe and the second parity position in the mapping table. In addition, the mapping management unit 902 is further configured: in response to a trigger condition being satisfied, updating the mapping table. The specific implementations are illustrated in the above embodiments of the present disclosure and therefore omitted herein.

The mapping management unit 902 is further configured to: determine an actual wearing level of a third disk of the plurality of disks based on a ratio of an average erase count to a maximum erase count of the third disk; and determine a wearing level of the third disk based on the actual wearing level of the third disk. Alternatively or in addition, the mapping management unit 902 is further configured to determine a wearing level of the third disk by: setting a reference wearing level for the third disk; and determining the wearing level of the third disk by adding the reference wearing level and the actual wearing level of the third disk. The specific implementations are illustrated in the above embodiments of the present disclosure and therefore omitted herein.

According to the embodiments of the present disclosure, there is provided a computer readable storage media comprising computer readable program instructions stored thereon, the computer readable program instructions being used to perform the method of controlling an access to a disk array according to the embodiments of the disclosure.

According to the embodiments of the present disclosure, there is provided a storage system, comprising an apparatus for controlling an access to a disk array according to the embodiments of the disclosure.

By the foregoing descriptions and the teaching given in the relevant drawings, modifications and other embodiments of the present disclosure illustrated herein would be envisioned by those skilled in the art. Hence, it should be understood that the embodiments of the present disclosure are not limited to the specific embodiments of the present disclosure, and modifications and other embodiments are covered in the scope of the present disclosure. Moreover, though the foregoing description and the relevant drawings describe the exemplary embodiments in the background of certain exemplary combinations of the components and/or functions, it should be realized that different combinations of components and/or functions can be provided in alternative embodiments without departing from the range of the present disclosure. On the point, for example, other combinations of components and/or functions different than the above explicit description are anticipated to be within the range of the present disclosure. Despite the specific terms employed herein, they are only used with general and descriptive meanings without any intention to make limitation thereto.

For those skilled in the art, embodiments of the present disclosure are apparently not confined to details of the above exemplary embodiments, and can be implemented in other specific manners without departing from the spirits or essential features of the embodiments of the present disclosure. Consequently, all the embodiments should be viewed as being exemplary rather than restrictive. Obviously, the word "comprise" does not exclude other elements and steps, and the word "one" does not exclude plural numbers. A plurality of elements as recited in the apparatus claims may be replaced by one element.

We claim:

1. A method of controlling an access to a disk array, the disk array including a plurality of disks that are divided into a plurality of stripes with same fixed storage capability, the method comprising:
   receiving a command for writing to a first stripe of the plurality of stripes; and
   determining a first parity position for the first stripe by searching a mapping table, the mapping table recording a first mapping between the first stripe and the first parity position allocated in the first stripe, the first parity position being arranged in a first disk of the plurality of disks having a minimum wearing level.

2. The method of claim 1, further comprising:
   in response to determining that a second stripe of the plurality of stripes is unable to be retrieved in the mapping table,
      selecting, from the plurality of disks, a second disk with a minimum wearing level among the plurality of disks to arrange a second parity position for the second stripe; and
      recording a second mapping between the second stripe and the second parity position in the mapping table.

3. The method of claim 2, further comprising:
   determining an actual wearing level factor for a third disk of the plurality of disks based on a ratio of an average erase count to a maximum erase count of the third disk; and
   determining a wearing level factor for the third disk based on the actual wearing level of the third disk.

4. The method of claim 3, wherein the determining the wearing level factor for the third disk comprises:
   setting a reference wearing level for the third disk; and
   determining the wearing level factor for the third disk by adding the reference wearing level and the actual wearing level of the third disk.

5. The method of claim 4, further comprising:
   adjusting the reference wearing level for the third disk dynamically.

6. The method of claim 5, further comprising:
   adjusting the reference wearing level for the third disk in response to a user request.

7. The method of claim 1, further comprising:
   in response to a trigger condition being satisfied, updating the mapping table.

8. The method of claim 7, wherein the trigger condition comprises at least one of:
   a time interval exceeds a first threshold since the mapping table is detected to record mappings associated with all of the plurality stripes,
   a count for input and output requests exceeds a second threshold since the mapping table is detected to record mappings associated with all of the plurality stripes, and
   traffic of the input and output requests exceeds a third threshold since the mapping table is detected to record mappings associated with all of the plurality stripes.

9. The method of claim 7, wherein the updating the mapping table comprises:
   determining a respective wearing level for each of the plurality of disks;
   updating a third parity position for a third stripe of the plurality of stripes periodically by selecting from the plurality of disks a fourth disk with a minimum wearing level among the plurality of disks to arrange the third parity position; and
   recording a third mapping between the third stripe and the updated third parity position in the mapping table.

10. The method of claim 9, wherein the updating the mapping table comprises:
    updating a fourth parity position for a fourth stripe of the plurality of stripes periodically by exchanging the fourth parity position with a data position; and
    recording a fourth mapping between the fourth stripe and the updated fourth parity position in the mapping table.

11. The method of claim 1, wherein each disk of the plurality of disks is a solid state disk (SSD) having a SSD wearing level value which represents an amount remaining life for that SSD; and
    wherein determining the first parity position for the first stripe includes:
       from multiple SSDs selected for holding the first stripe, selecting the SSD having the lowest SSD wearing level value to effectuate placement of parity for the first stripe in the SSD furthest from its end of life.

12. An apparatus for controlling an access to a disk array, the disk array including a plurality of disks that are divided into a plurality of stripes with same fixed storage capability, the apparatus comprising:
    a receiving unit configured to receive a command for writing to a first stripe of the plurality of stripes; and
    a mapping management unit configured to determine a first parity position for the first stripe by performing a searching operation that searches a mapping table, a result of the searching operation including the mapping table recording a first mapping which defines a relationship between the first stripe and the first parity position allocated in the first stripe, the relationship identifying the first parity position as being arranged in a first disk of the plurality of disks having a minimum wearing level;
    wherein each disk of the plurality of disks has a respective wearing level identifying an amount of remaining life for that disk, the first disk having the lowest wearing level to indicate that the first disk currently has the longest remaining service life among the other disks of the plurality of disks.

13. The apparatus according to claim 12, wherein the mapping management unit is further configured to:
    in response to determining that a second stripe of the plurality of stripes is unable to be retrieved in the mapping table,
       select, from the plurality of disks, a second disk with a minimum wearing level among the plurality of disks to arrange a second parity position for the second stripe; and record a second mapping between the second stripe and the second parity position in the mapping table.

14. The apparatus according to claim 13, wherein the mapping management unit is further configured to:
   determine an actual wearing level factor for a third disk of the plurality of disks based on a ratio of an average erase count to a maximum erase count of the third disk; and
   determine a current wearing level factor for the third disk based on the actual wearing level of the third disk.

15. The apparatus according to claim 14, wherein the mapping management unit is further configured to determine the current wearing level factor for the third disk by:
   setting a reference wearing level for the third disk; and
   determining the current wearing level factor for the third disk by adding the reference wearing level and the actual wearing level of the third disk.

16. The apparatus according to claim 15, wherein the mapping management unit is further configured to:
   adjust the reference wearing level for the third disk dynamically.

17. The apparatus according to claim 16, wherein the mapping management unit is further configured to:
   adjust the reference wearing level for the third disk in response to a user request.

18. The apparatus according to claim 12, wherein the mapping management unit is further configured to:
   in response to a trigger condition being satisfied, updating the mapping table.

19. The apparatus according to claim 18, wherein the trigger condition comprises at least one of:
   a time interval exceeds a first threshold since the mapping table is detected to record mappings associated with all of the plurality stripes,
   a count for input and output requests exceeds a second threshold since the mapping table is detected to record mappings associated with all of the plurality stripes, and
   traffic of the input and output requests exceeds a third threshold since the mapping table is detected to record mappings associated with all of the plurality stripes.

20. The apparatus according to claim 18, wherein the mapping management unit is further configured to update the mapping table by:
   determining a respective wearing level for each of the plurality of disks;
   updating a third parity position for a third stripe of the plurality of stripes periodically by selecting from the plurality of disks a fourth disk with a minimum wearing level among the plurality of disks to arrange the third parity position; and
   recording a third mapping between the third stripe and the updated third parity position in the mapping table.

21. The apparatus according to claim 20, wherein the mapping management unit is further configured to update the mapping table by:
   updating a fourth parity position for a fourth stripe of the plurality of stripes periodically by exchanging the fourth parity position with a data position; and
   recording a fourth mapping between the fourth stripe and the updated fourth parity position in the mapping table.

22. The apparatus according to claim 12, wherein each disk of the plurality of disks is a solid state disk (SSD) having a SSD wearing level value which represents an amount remaining life for that SSD; and
   wherein determining the first parity position for the first stripe includes:
      from multiple SSDs selected for holding the first stripe, selecting the SSD having the lowest SSD wearing level value to effectuate placement of parity for the first stripe in the SSD furthest from its end of life.

23. A method of storing data, the method comprising:
   receiving a write command to write data to a disk array having a plurality of solid state disks (SSDs), each SSD of the plurality of SSDs having a SSD wearing level value which represents an amount remaining life for that SSD, and each SSD of the plurality of SSDs providing multiple storage locations;
   in response to the write command, performing a mapping operation that accesses a mapping table to select a storage stripe to hold the data, the mapping operation (i) selecting, as the storage stripe, storage locations in a group of SSDs of the plurality of SSDs, and (ii) selecting, based on the SSD wearing level value of each SSD of the group of SSDs, a particular storage location from the storage locations in the group of SSDs, the particular storage location being in the SSD of the group of SSDs having the most remaining life; and
   writing parity for the data to the particular storage location selected from the storage locations in the group of SSDs and the data to remaining storage locations in the group of SSDs.

* * * * *